(12) United States Patent
Lee et al.

(10) Patent No.: US 9,952,997 B2
(45) Date of Patent: Apr. 24, 2018

(54) METHOD FOR IMPROVING DATA TRANSMISSION SPEED AND ELECTRONIC DEVICE IMPLEMENTING THE SAME

(71) Applicant: Samsung Electronics Co., Ltd., Gyeonggi-do (KR)

(72) Inventors: Junebum Lee, Gyeonggi-do (KR); Eunseok Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/066,770

(22) Filed: Mar. 10, 2016

(65) Prior Publication Data
US 2016/0275031 A1    Sep. 22, 2016

(30) Foreign Application Priority Data
Mar. 16, 2015   (KR) .................. 10-2015-0036212

(51) Int. Cl.
*G06F 13/00*   (2006.01)
*G06F 13/40*   (2006.01)
*G06F 13/20*   (2006.01)

(52) U.S. Cl.
CPC .......... *G06F 13/4022* (2013.01); *G06F 13/20* (2013.01); *G06F 13/4068* (2013.01)

(58) Field of Classification Search
None
See application file for complete search history.

(56) References Cited

U.S. PATENT DOCUMENTS

2009/0327536 A1*   12/2009   Solomon ............... G06F 13/426
                                                                 710/63
2011/0261269 A1    10/2011   Khan

* cited by examiner

*Primary Examiner* — Idriss N Alrobaye
*Assistant Examiner* — Richard B Franklin
(74) *Attorney, Agent, or Firm* — The Farrell Law Firm, P.C.

(57) ABSTRACT

A method for improving a data transmission speed and an electronic device implementing the same are provided. The electronic device includes a USB connection unit configured to be connectable to an external electronic device and including designated data reception channels and data transmission channels, a switch unit configured to switch an electrical connection between the data reception channels and data transmission channels, and a control unit configured to confirm device attribute information of the external electronic device that is connected through the USB connection unit and to control the switch unit to switch the electrical connection so that at least one data reception channel functions as a data transmission channel if the connected external electronic device is a display device.

8 Claims, 9 Drawing Sheets

METHOD FOR IMPROVING DATA TRANSMISSION SPEED AND ELECTRONIC DEVICE IMPLEMENTING THE SAME

PRIORITY

This application claims priority under 35 U.S.C. § 119(a) to Korean Patent Application Serial Number 10-2015-0036212, which was filed on Mar. 16, 2015, in the Korean Intellectual Property Office, the entire disclosure of which is incorporated herein by reference.

BACKGROUND

1. Field of the Disclosure

The present disclosure generally relates to a method for improving a data transmission speed and an electronic device implementing the same, and more specifically, to a method of improving a data transmission speed by switching an electrical connection so that a data reception channel of the electronic device functions as a data transmission channel in the case where an external display device is connected to the electronic device.

2. Description of the Related Art

Recently developed portable devices may be used for various purposes. The portable devices may be manufactured with a size and weight suitable for carrying by users. Most users desire portable devices with smaller size and lighter weight. Such requirements may limit the size (such as screen size) and the weight of the portable devices. The limited screen sizes of the portable devices may cause user inconvenience in providing video content. For example, a portable device including a screen having a size of 4 to 6 inches may be limited in its ability to provide video content. Specifically, since video content is created with high resolution, e.g., Quad Full HD (QFHD), 4 k resolution (resolution that is four times higher than the existing HD resolution) or Ultra-High Definition (UHD), a screen having a size of 4 to 6 inches is limited in its ability to provide high-resolution video content.

Accordingly, the portable device may be connected to an external display device having a built-in screen that is larger than the screen of the portable terminal to display content (e.g., video data having high resolution such as QFHD or UHD) that is stored in the portable device through the larger screen of the external display device. Here, the external display device may not be standardized for compatibility between electronic devices, but may be connected to the portable device using a Universal Serial Bus (USB) port. Further, in order to transmit high-resolution video data from the portable device to the external display device, it is necessary to consider the data transmission speed of a cable that is connected between the portable device and the external display device. For example, QFHD (4 k) video content should be transmitted at a speed of about 20 Gbps, and thus it requires that the data transmission speed capability of the cable is greater than or equal to 20 Gbps.

In the case of transmitting/receiving data through a USB port, an electronic device having the USB port built therein may transmit the data through a transmission channel (TX channel), and may receive the data through a reception channel (RX channel). For example, in the case of USB 3.0, one transmission channel and one reception channel are separately implemented, and the transmission channel serves to transmit the data, while the reception channel serves to receive the data. The respective channels have maximum transmission speeds, and thus are unable to transmit the data faster than the maximum transmission speeds. USB 3.0 is an interface which may be an upgrade to USB 2.0. The maximum speed of USB 3.0 is about 4.8 Gbps per second which is 10 times faster the maximum speed of the USB 2.0 that transmits at 480 Mbps per second. Although the USB interface may have an improved transmission speed corresponding to USB 3.0, it is limited in its ability to process the high-resolution video content. For example, HDMI 2.0, which supports a full HD video output, is composed of four lanes that support 5.94 Gbps. However, a USB Type C, such as Type C of USB 3.1, is composed of two transmission lines (having maximum speed of about 10 Gbps), and thus in comparison with HDMI 2.0, its capability for full HD video output may be limited.

SUMMARY

In accordance with an aspect of the present disclosure, an electronic device is provided that can improve a data transmission speed by switching a reception channel to a transmission channel and includes a USB connection unit configured to be connectable to an external electronic device and including designated data reception and transmission channels, a switch unit configured to switch an electrical connection between the data reception and transmission channels, and a control unit configured to confirm device attribute information of the external electronic device that is connected through the USB connection unit and to control the switch unit to switch the electrical connection so that the data reception channel functions as the data transmission channel if the connected external electronic device is a display device.

In accordance with another aspect of the present disclosure, a method for improving a transmission speed of an electronic device by switching a reception channel to a transmission channel includes recognizing a connection with an external electronic device through a USB connection unit including data reception and transmission channels, confirming device attribute information of the connected external electronic device and if the connected external electronic device is a display device, switching an electrical connection between the data reception and transmission channels so that the data reception channel functions as the data transmission channel.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Hereinafter, various embodiments of the present disclosure will be described in detail with reference to the accompanying drawings. The following description with reference to the accompanying drawings is provided to assist in an understanding of various embodiments of the present disclosure as defined by the claims and their equivalents. The description includes various specific details to assist in the understanding but they are to be regarded as merely exemplary. Accordingly, those of ordinary skill in the art will recognize that various changes and modifications of the embodiments described herein can be made without departing from the scope and spirit of the present disclosure. In the accompanying drawings, similar reference numerals are used for similar constituent elements.

In various embodiments of the present disclosure, the terms "module" or "unit" may be used in providing the description, and any important meaning or role is not specifically given thereto. Accordingly, it is to be noted that the terms "module" and the "unit" may be used interchangably.

The terms "includes" or "is composed of" used in various embodiments of the present disclosure indicate the existence of a corresponding function, an operation, or a constituent element that is disclosed, and do not limit additional functions, operations, or constituent elements. Further, in various embodiment of the present disclosure, it should be understood that the terms "includes" or "is composed of" designates the existence of the feature, figure, step, operation, constituent element, component, or a combination thereof, and do not preclude the existence or addition of one or more other features, figures, steps, operations, constituent elements, components, and combinations thereof.

In various embodiments of the present disclosure, the term "or" includes any one or all combinations of words enumerated together. For example, "A or B" may include A, B, or both A and B.

The terms "first" and "second" used in various embodiments of the present disclosure refer to various constituent elements, but they should not limit the corresponding constituent elements. For example, the above-described terms do not limit the order and/or importance of the corresponding constituent elements, but may be used to differentiate a constituent element from other constituent elements. For example, a first user appliance and a second user appliance are all user appliances, and indicate different user appliances. For example, a first constituent element may be referred to as a second constituent element, and a second constituent element may be referred to as a first constituent element and so forth without departing from the spirit and scope of the present disclosure.

In various embodiments of the present disclosure, the terms used for explaining specific embodiments do not limit the various embodiments of the present disclosure. In the description, a singular expression may include a plural expression unless specifically described.

Unless specifically defined, all terms (including technical and scientific terms) used in the description have meanings commonly understood by those of ordinary skill in the art to which the present disclosure belongs. In addition, terms that are generally used but are not defined in the dictionary are not to be interpreted ideally or excessively unless they have been clearly and specifically defined.

An electronic device according to various embodiments of the present disclosure is an electronic device and may include, for example, at least one of a smart phone, a tablet PC, a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, a wearable device (e.g., Head Mounted Device (HMD) such as electronic glasses), electronic clothes, an electronic bracelet, an electronic necklace, an electronic appcessory, an electronic tattoo, and a smart watch.

Hereinafter, an electronic device according to various embodiments of the present disclosure will be described with reference to the accompanying drawings. The term "user" used in various embodiments may be a person who uses the electronic device or a device (e.g., artificial intelligence electronic device) that uses the electronic device.

Figure 1:
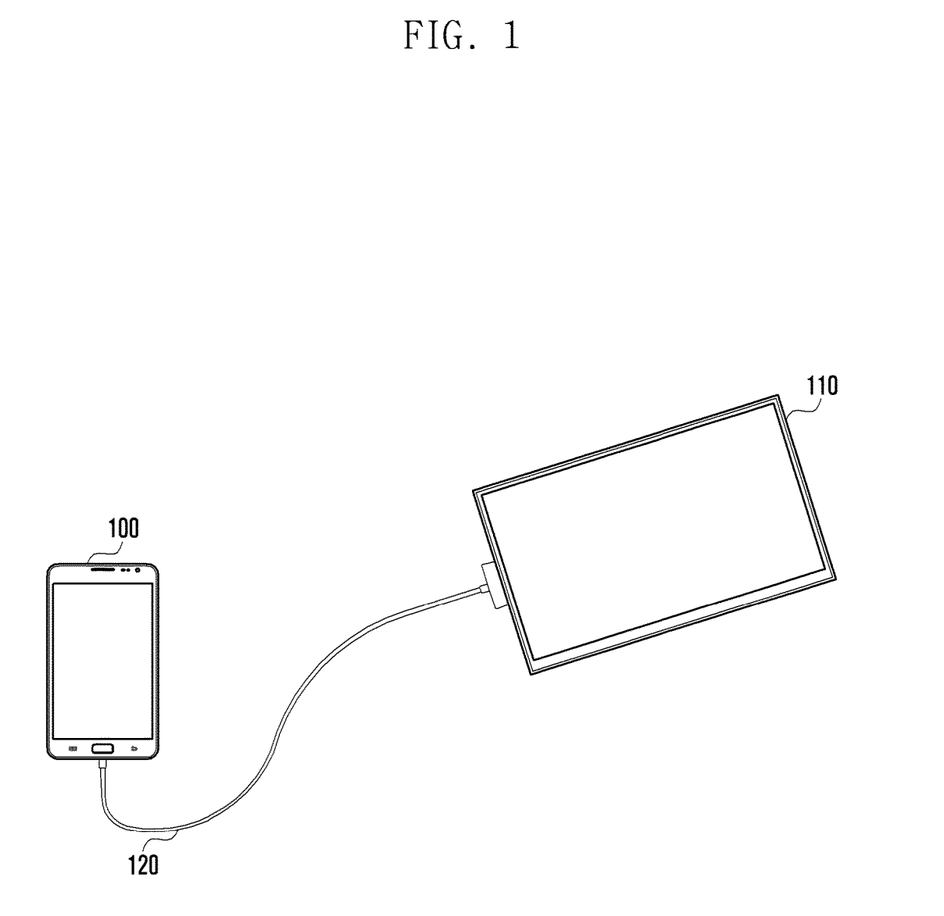
FIG. 1 is a view illustrating a connection state of an electronic device according to various embodiments of the present disclosure and a display device.

FIG. 1 is a view illustrating a connection state of an electronic device according to various embodiments of the present disclosure and a display device.

Referring to FIG. 1, an electronic device (e.g., a portable terminal or a smart phone) 100 is connected to a display device 110 using a cable (e.g., USB Type C cable) 120. The display device 110 is an external electronic device and may be an electronic device including a display (e.g., electronic device that can output high-resolution content, such as large-scale TV or QFHD). The display device 110 may receive data from the electronic device 100 and may display the data. The cable 120 according to an embodiment of the present disclosure is a USB Type C cable, but is not limited thereto.

USB has been developed into multiple standard versions including 1.0, 1.1 (full speed), 2.0 (high speed), 3.0 (super speed), and 3.1. As the standard number is increased, the data transmission speed thereof has been continuously improved. For example, USB 1.0 provides a minimum speed of 1.5 Mbps and a maximum speed of 12 Mbps. USB 2.0 provides a maximum speed of 480 Mbps and the maximum transmission speed of USB 3.0 reaches 5 Gbps. Further, USB 3.1 provides the transmission speed that is about twice as fast as the transmission speed of USB 3.0, and the connection port of USB 3.1 may be of Type C. The maximum voltage V of USB 3.1 that can be transferred to a device connected thereto is increased to four times the maximum voltage (5V) of USB 3.0, that is, 20V, and the current capacity is increased from 2 A to 5 A. The USB Type C is one representative interface type of the USB 3.1 standard.

The electronic device 100 illustrated in FIG. 1 is connected to the display device 110 using the cable such as USB Type C cable, and a connection port of the cable 120 may be USB Type C such as Type C of USB 3.1. Hereinafter, it is described that the connection port of the cable 120 is USB Type C, but is not limited thereto.

The electronic device 100 may be a portable electronic device and the portable electronic device may be generally limited in the screen size. Accordingly, the electronic device 100 may be connected to the external display device 110 so as to display content (e.g., image or moving image) stored in the electronic device 100 or streaming content through a larger screen of the external display device 110. That is, the electronic device 100 may transmit the content to the display device 110 so that the content is output through the display device 100. In order for the electronic device 100 to transmit high-resolution content to the display device 110, the connection cable between the electronic device 100 and the display device 110 may be a USB Type C cable 120. The USB Type C is one representative interface type of USB 3.1 that is improved over USB 3.0. The USB Type C may provide fast data transmission speed among the USB ports. However, even if the USB Type C is used, it may meet the requirements necessary to transmit high-resolution video content, which requires a data transmission speed that is faster than the maximum transmission speed of the USB Type C (about 10 Gbps), from the electronic device 100 to the display device 110.

For example, HDMI 2.0 is an interface that supports full HD and simultaneously transfers digital video and audio signals through one cable. The HDMI 2.0 is composed of four lines that support 5.94 Gbps, and can transmit data at a maximum speed of 18 Gbps. In comparison, the USB Type C is composed of two transmission lines and two reception lines, and can transmit data at a maximum speed of 10 Gbps. In the case of transmitting video content such as video content having 4 k or more resolution that requires a data transmission speed that is faster than 10 Gbps using the USB Type C, the data transmission may be delayed.

Figure 2:
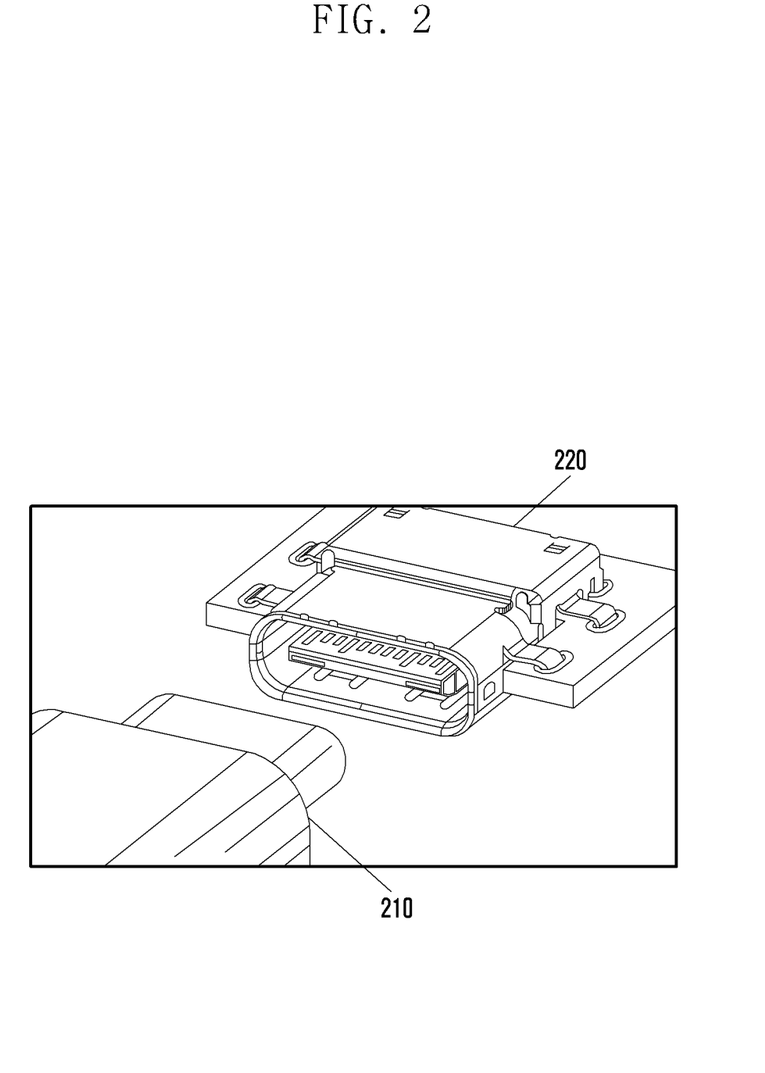
FIG. 2 is a view illustrating a USB Type C port according to various embodiments of the present disclosure.

FIG. 2 is a view illustrating a USB Type C port according to various embodiments of the present disclosure.

Referring to FIG. 2, a USB Type C port is divided into USB Type C upstream and downstream ports and the USB Type C upstream port 210 is coupled to the USB Type C downstream port 220. The USB Type C upstream port 210 and the USB Type C downstream port 220 are not discriminated in upward/downward direction. That is, the USB Type C may be coupled to be recognized regardless of any specific direction. The USB Type C may be a representative interface of USB 3.1 that is improved over the USB 3.0. Further, the USB Type C upstream port 210 and the USB Type C downstream port 220 may be connected to each other based on 24 pins. Specifically, 12 pins may be built on one surface of a port coupling portion of the USB Type C downstream port 220, and 12 pins may be built on the opposite surface thereof. Further, 24 pins of the USB Type C upstream port 210 may be at points that correspond to, the positions of the pins in the USB Type C downstream port 220.

Figure 3:
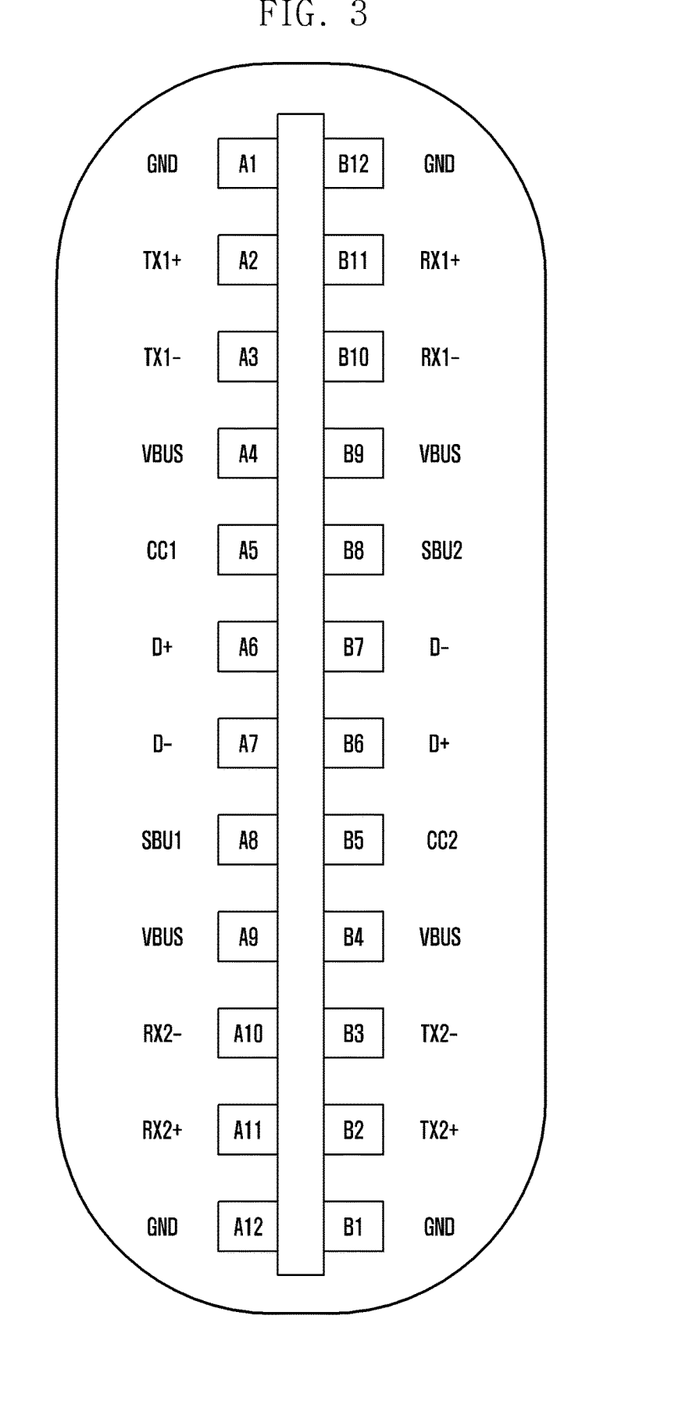
FIG. 3 is a view illustrating the roles of pins of a USB Type C port according to various embodiments of the present disclosure.

FIG. 3 is a view illustrating the roles of pins of a USB Type C port according to various embodiments of the present disclosure.

FIG. 3 illustrates a USB Type C downstream port (USB Type C downstream port 220 of FIG. 2). The USB Type C downstream port may be composed of 24 pins in total. Further, pins of the USB Type C upstream port (USB Type C upstream port 210 of FIG. 2) may be at points that correspond to the positions of the pins of the USB Type C downstream port. The USB Type C is not divided into directions, but the following explanation of the functions of the respective pins will be made on the assumption that the USB Type C is divided into a left surface A1 to A12 and a right surface B1 to B12. The pins that constitute the left surface and the right surface are arranged in the same order in opposite directions. For example, the left surface may be composed of one transmission channel A2 and A3, one reception channel A10 and A11, two ground pins A1 and A12, two power (Vbus) pins A4 and A9, one configuration channel (CC) pin A5, USB 2.0 interface pins A6 and A7, and a sideband use (SBU) pin A8. Further, the right surface may be composed in the same manner as the left surface in an opposite direction. That is, the USB Type C may utilize two transmission channels A2, A3, B2, and B3 and two reception channels A10, A11, B10, and B11. Here, the transmission channel and the reception channel may be described as the data transmission channel and the data reception channel. Among the above-described pins, the CC pins A5 and B5 may be used to determine the kind of connected electronic device. Further, the USB 2.0 interface pins A6 and A7 may confirm that USB 2.0 is connected to the USB Type C, and may transmit/receive data corresponding to the USB 2.0. In addition, the ground pins A1, A12, B1, and B12 serve as ground, and the power (Vbus) pins A4, A9, B4, and B9 supply the power. The SBU pins A8 and B8 may serve as a secondary bus. The USB Type C may transmit data at the maximum speed of 10 Gbps through the two transmission channels A10, A11, B10, and B11.

Figure 4:
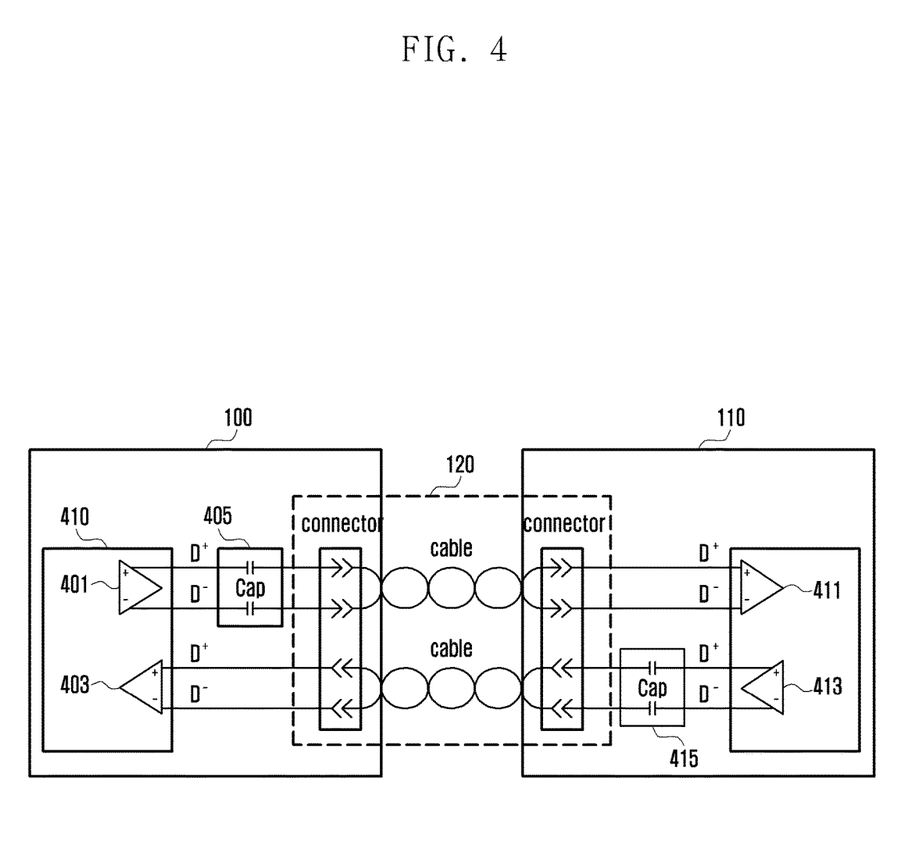
FIG. 4 is a schematic circuit diagram illustrating an electronic device according to various embodiments of the present disclosure that is connected to another electronic device on the basis of a USB Type C port.

FIG. 4 is a schematic circuit diagram illustrating an electronic device according to various embodiments of the present disclosure that is connected to another electronic device on the basis of a USB Type C port. Referring to FIG. 4, the electronic device 100 is connected to the display device 110 using the USB Type C cable 120. The electronic device 100 includes a control unit 410, a capacitor 405, and a USB Type C connection port. The control unit 410 is a unit that controls the operation of the electronic device 100, and includes a transmission buffer 401 and a reception buffer 403. Although FIG. 4 illustrates that the electronic device 100 includes the transmission buffer 401 and the reception buffer 403, the electronic device 100 may include various elements in addition to the buffers. Further, the transmission buffer 401 is connected to the capacitor (Cap) 405, and may transmit data through a USB Type C connection port that is connected to the capacitor 405. Here, the USB Type C connection port may be the USB Type C upstream or downstream port as described above with reference to FIG. 2. For example, if the USB Type C port in the electronic device is the upstream port, the USB Type C port that is included in the USB Type C cable 120 may be the downstream port. Both ends of the USB Type C cable 120 may be composed of the USB Type C ports, and may connect the electronic device 100 and the display device 110 to each other on the basis of the USB Type C.

A connector as illustrated in FIG. 2 may be the USB Type C port. Referring to FIG. 3, the USB Type C is port is composed of two transmission (TX) lines (channels) and two reception (RX) lines (channels). The USB Type C may uni-directionally transmit a signal on the basis of the transmission channels and the reception channels. For example, the transmission channels and the reception channels may not bi-directionally transmit/receive the signal, but may transmit or receive the data only in one direction.

The display device 110 also includes a reception buffer 411 that receives data and a transmission buffer 413 that transmits the data. In general, the display device 110 may receive the data from the electronic device 100 through the reception buffer 411, and may output the received data to the display screen.

Referring to FIG. 4, the transmission buffer 401 of the electronic device 100 transmits a signal to the reception buffer 411 of the display device 110 through the USB Type C cable 120. Further, the transmission buffer 413 of the display device 110 transmits a signal to the reception buffer 403 of the electronic device 100 through the USB Type C cable 120. That is, based on the electronic device 100, a "transmission channel" may be composed of the transmission buffer 401 of the electronic device 100, the capacitor 405 of the electronic device 100, and reception buffer 411 of the display device 110, and a "reception channel" may be composed of the reception buffer 403 of the electronic device 100, the capacitor 415 of the display device 110, and the transmission buffer 413 of the display device 110.

Figure 5:
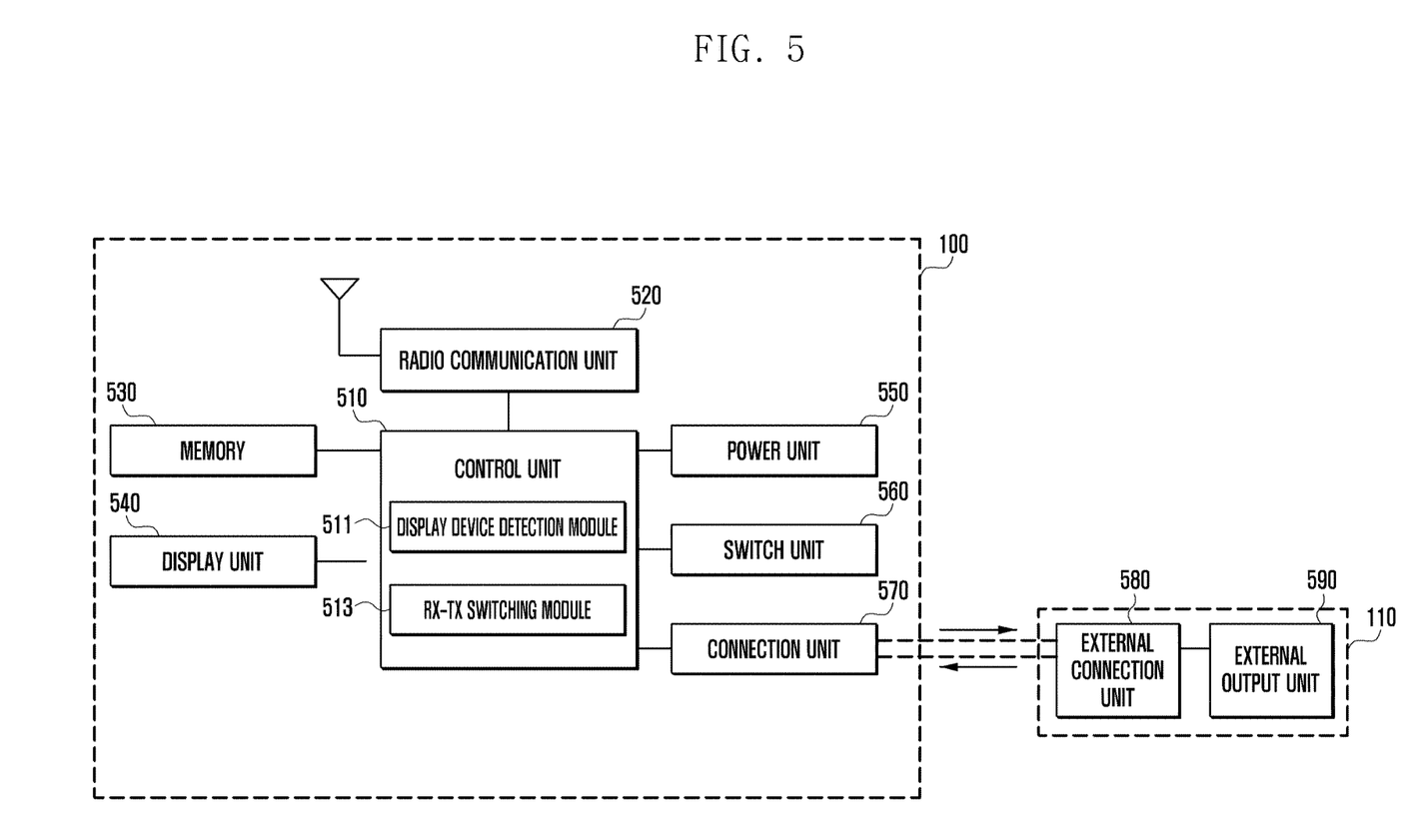
FIG. 5 is a block diagram of an electronic device according to various embodiments of the present disclosure and a display device.

FIG. 5 is a block diagram of an electronic device according to various embodiments of the present disclosure and a display device.

Referring to FIG. 5, an electronic device 100 includes a control unit 510, a radio communication unit 520, a memory 530, a display unit 540, a power unit 550, a switch unit 560 and a connection unit 570. The above-described constituent elements are connected to one another by a bus, and the control unit 510 may transfer a signal such as a control message, to the constituent elements to control the constituent elements. Further, the display device 110 includes an external connection unit 580 and an external output unit 590.

The control unit 510 of the electronic device 100 may typically control the overall operation of the electronic device 100. For example, the controller 510 may receive a command from other constituent elements (e.g., the radio communication unit 520, the memory 530, the display unit 540, the power unit 550, the switch unit 560 and the connection unit 570) through the bus, decode the received command, and perform an operation or data processing according to the decoded command. A Communication Processor (CP) for performing radio communication may be included in the control unit 510. The CP may be separately built in the electronic device 100 to enable the electronic device 100 to receive a radio communication service under the control of the control unit 510. The control unit 510 of the electronic device 100 according to an embodiment of the present disclosure may send/receive signals such as data, to/from the display device 110 that is connected through the connection unit 570, and the control unit 510 may control the operation of the display device 110. For example, the control unit 510 of the electronic device 100 may switch the transmission/reception channels of the display device 110.

The control unit 510 includes a display device detection module 511 and an RX-TX switching module 513. The display device detection module 511 and the RX-TX switching module 513 are included in the control unit 510, or may be in the electronic device 100 separately from the control unit 510 to be controlled by the control unit 510.

In the case where the electronic device 100 is connected to another external electronic device such as a display device 110, the display device detection module 511 may determine whether the connected electronic device is the display device 110. For example, the display device 110 may include a Configuration Channel (CC) pin. Further, on the CC pin, a resistance value for recognizing the display device 110 may be predefined. The resistance value is an example, but is not limited thereto. On the CC pin, a voltage value or a current value may be predefined in addition to the resistance value. Further, the CC pin may include a certain code value that can specify the display device 110. Accordingly, if the electronic device 100 is connected to another external electronic device, the display device detection module 511 may determine whether the other electronic device that is connected on the basis of the CC pin of the other electronic device is the display device 110.

The RX-TX switching module 513 may switch the operations of the transmission channel and the reception channel. For example, the RX-TX switching module 513 may switch the electrical connection so that the reception channel through which the electronic device 100 can receive the signal from the external electronic device can function as the transmission channel. The RX-TX switching module 513 according to the present disclosure may switch the electrical connection so that the reception channel of the electronic device 100 functions as the transmission channel in the case where it is confirmed that the external electronic device connected to the electronic device 100 is the display device 110.

The radio communication unit 520 may include one or more constituent elements that make it possible to perform a radio communication between the electronic device 100 and a radio communication network and to perform radio communication between the electronic device 100 and another electronic device. For example, the radio communication unit 520 may include modules such as a WIFI module, a cellular module, a Bluetooth module, a GPS module, and an NFC module, that can perform radio communication, and the modules may perform radio communication with other electronic device on the basis of the modules.

The memory 530 is a storage space in which data of the electronic device 100 may be stored and information related to the functions performed by the electronic device 100 may be stored in the memory 530. For example, the memory 530 may store various kinds of application programs and data that are executed and processed by the electronic device 100 and may be composed of one or more nonvolatile memories and volatile memories. The memory 530 according to the present disclosure may include at least one of a Read Only Memory (ROM), a flash memory, a Random Access Memory (RAM), a built-in Hard Disk Drive (HDD), an external HDD, and an external storage medium. Further, the memory 530 may transmit/receive data between the HDD and a Central Processing Unit (CPU), and the performance of the memory 530 may be determined on the basis of a clock signal within the memory 530.

The display unit 540 may display various kinds of information (e.g., stored program such as an application) related to the functions that are performed by the electronic device 100. The display unit 540 may be a Liquid Crystal Display (hereinafter referred to as "LCD"), and in the case where the LCD is formed in a touch screen type, the display unit 540 may be an input means. The display unit 540 according to an embodiment of the present disclosure may display content (e.g., video or images) stored in the electronic device 100. In the case where the electronic device 100 is connected to the display device 110, the content that is displayed on the display unit 540 of the electronic device 100 may be also be displayed in the same manner through the external output unit 590 of the display device 110.

The power unit 550 may supply power to the electronic device 100 to operate various constituent elements of the electronic device 100. The power unit 550 may include a battery, a Power Management Integrated Circuit (PMIC) and a charger Integrated Circuit (IC). The battery charger may support wired or wireless charging. The wireless charging type may include a magnetic resonance type, a magnetic induction type, or an electromagnetic wave type, and may further include an additional circuit for supporting the wireless charging such as a coil loop, a resonance circuit, or a rectifier. The power unit 550 may supply power to the electronic device 100 and may supply the power on the basis of the type or capacity of the content to be processed by the electronic device 100.

The switch unit 560 may be included in a circuit diagram for signal flow of the electronic device 100. The switch unit 560 may change the direction of the signal under the control of the control unit 510. That is, the switch unit 560 may switch the electrical connection so that the reception channel of the electronic device 100 functions as the transmission channel under the control of the control unit 510. The switch unit 560 according to an embodiment of the present disclosure may operate under the control of the control unit 510, and may switch the electrical connection so that the reception (Rx) channel for reception in the electronic device 100 functions as the transmission (Tx) channel for transmission from the electronic device 100.

The connection unit 570 may be an interface for connection between the electronic device 100 and another electronic device. In the case where an external electronic device is connected thereto, the connection unit 570 may inform the control unit 510 of the connection information. The connection unit 570 according to an embodiment of the present disclosure may be a USB interface. The connection unit 570 may be a USB Type C type of USB 3.1, and may transmit data at the maximum speed of 10 Gbps. The USB Type C is divided into multiple channels including the transmission channel and the reception channel, and each of the channels may be composed of two differential lines. The USB Type C can transmit data at the maximum speed of 10 Gbps, but may be limited in its ability to transmit video content having high resolution, such as Quad Full HD (QFHD). As the resolution of the content such as moving images, becomes gradually higher, the amount of data required for the electronic device 100 to process per second may be greater. That is, in the case where the electronic device 100 transmits the high-resolution video content to the external electronic device 100, the transmission of the video content may be limited depending on the data transmission speed and the video coding format. In order to smoothly process the high-resolution video content, the connection unit 570 according to an embodiment of the present disclosure may switch the reception channel to the transmission channel, and the data transmission speed can be doubled.

The display device 110 is connected to the electronic device 100 using the connection unit 570 of the electronic device 100 and the external connection unit 580 of the display device 110. The display device 110 includes an external connection unit 580 and an external output unit 590.

The display device 110 may be generally used for the purpose of content output, and may receive content such as video content, from the electronic device 100 to output the received content. The display device 110 that is connected to the electronic device 100 may not transmit/receive data with the electronic device 100, but may only receive content from the electronic device 100 and output the received content through the external output unit 390. In other words, the main operation of the display device 110 is to receive data through the reception channel and to output content to a display. In this case, the transmission channel may be seldom used. The transmission channel of the display device 110 may be temporarily used to transmit a control signal indicating that the connected external electronic device is the display device 110 when the display device 110 is connected to the electronic device 100. The display device 110 according to an embodiment of the present disclosure may switch the existing transmission channel to the reception channel under the control of the control unit 510. That is, the display device 110 may receive data from the electronic device 100 based on the existing reception channel and the switched reception channel, i.e., two reception channels in total operating in parallel. Accordingly, the display device 110 can receive the data at a transmission speed such as 20 Gbps, which is double the transmission speed when the display device 110 receives data through only one reception channel.

The external connection unit 580 may be a connection interface that is built in the display device 110. The external connection unit 580 according to an embodiment of the present disclosure may be connected to the connection unit 570 of the electronic device 100 and a connection means may be a cable based on a specific connection port. In an embodiment of the present disclosure, the connection ports of the external connection unit 580 and the connection unit 570 are USB Type C, but are not limited thereto.

Further, the external output unit 590 is an output unit that is built in the display device 110 and may be a screen display for reproducing the content. The external output unit 590 according to an embodiment of the present disclosure, may support high resolution video to smoothly output high-resolution video content, such as QFHD.

Figure 6:
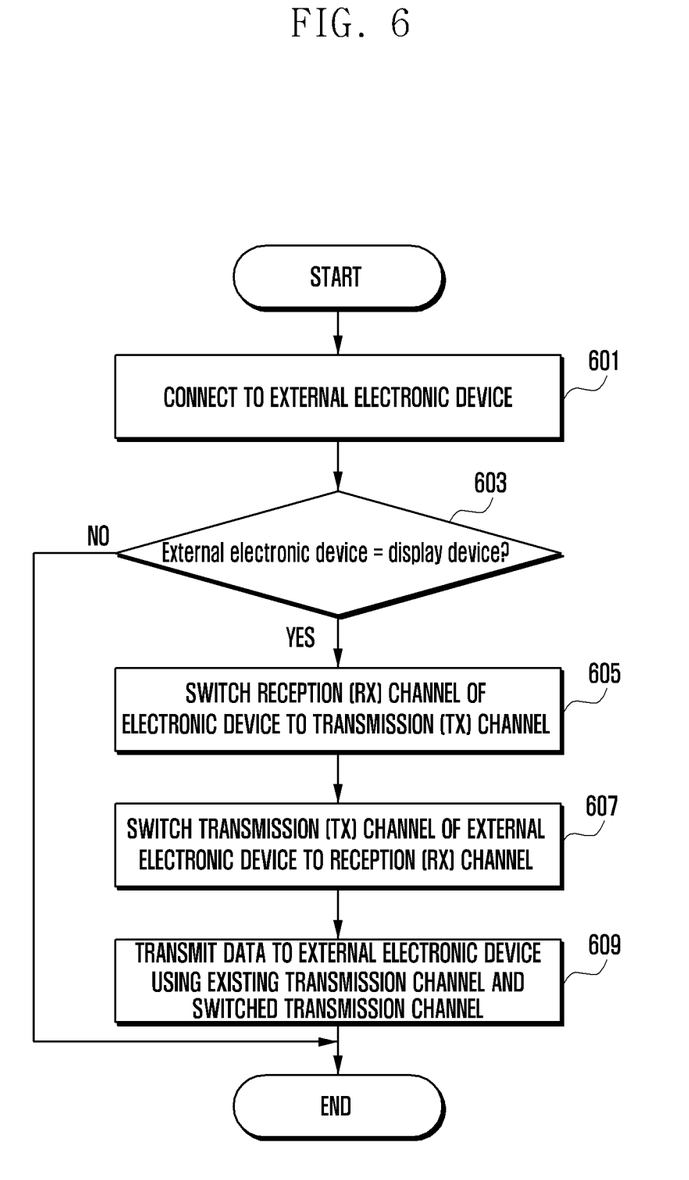
FIG. 6 is a flowchart showing a method for confirming a connection between an electronic device and a display device and improving a transmission speed through switching of a reception channel to a transmission channel according to an embodiment of the present disclosure.

FIG. 6 is a flowchart showing a method for confirming a connection between an electronic device and a display device and improving a transmission speed through switching of a reception channel to a transmission channel according to an embodiment of the present disclosure.

Referring to FIG. 6, at step 601, the electronic device 100 is connected to the external electronic device. Here, the external electronic device is an electronic device that is compatible with the electronic device 100 and may be an electronic device that can be connected by a cable through the connection unit 570 of the electronic device 100. For example, the external electronic device may be an electronic device that includes a display, such as a TV, a large-screen TV, a tablet PC, or a PC monitor.

At step 603, the control unit 510 of the electronic device 100 confirms whether the connected external electronic device is the display device 110. For example, the external electronic device may include device attribute information, and may store the device attribute information. Here, the term "device attribute information" may be information on which kind of electronic device the external electronic device is or which function(s) the external electronic device performs. The device attribute information may be stored in a specific space of the corresponding device. The CC pin may be configured to provide a specific value for confirming the type of external electronic device which may be the display device 110. The specific value may be predetermined and may include numerical values or ranges of values of voltage, resistance, and current. Further, the control unit 510 of the electronic device 100 may confirm whether the connected external electronic device is the display device 110 on the basis of the CC pin included in the external electronic device. Further, the CC pin may include its own ID value, and the control unit 510 of the electronic device 100 may recognize that the connected external electronic device is the display device on the basis of the ID value included in the CC pin. If it is confirmed, at step 603, that the external electronic device is the display device 110, the control unit 510 of the electronic device 100 switches the reception (Rx) channel of the electronic device 100 to the transmission (Tx) channel at step 605. That is, the control unit 510 of the electronic device 100 switches the electrical connection so that the data reception channel of the electronic device 100 functions as the data transmission channel. The control unit 510 according to another embodiment of the present disclosure may recognize that the external electronic device is the display device 110, and then additionally confirm the standard specification of the display device 110. The control unit 510 may confirm whether the display device 110 supports the standard specification require to output QFHD (4 k) class content. The standard specification is not limited to the specification required to output QFHD-class content. The standard specification may be a specification required to output video content having high resolution that corresponds to the transmission speed when data is transmitted through two transmission channels. When the connection type between the electronic device 100 and the display device 110 is the USB Type C, the maximum transmission speed may be 10 Gbps. Accordingly, although the QFHD-class (5.94 Gbps, 4 lines) content is an example, the transmission speed is not limited thereto. At step 605, the control unit 510 switches the reception channel of the electronic device 100 to the transmission channel only in the case where the display device 110 supports the standard specification.

After switching the reception channel of the electronic device 100 to the transmission channel at step 605, the control unit 510 switches the transmission channel of the external electronic device (display device) to the reception channel at step 607. For example, the control unit 510 may transmit a switching request signal to the display device 110, and the display device 110 may switch the transmission channel to the reception channel in response to the switching request signal. The operation of switching the transmission channel to the reception channel may be a software operation, a hardware operation, a combination of software and hardware but is not limited to any one operation.

At step 609, the control unit 510 of the electronic device 100 transmits data to the external electronic device (display device 110) using the existing transmission channel and the switched transmission channel (at step 605, the existing reception channel is switched to the transmission channel). Since the control unit 510 transmits data through two channels, it can transmit the data to the external electronic device at the transmission speed that double the transmission speed in the case of transmitting the data on one transmission channel. In general, the display device 110 may primarily receive and output data, and it may switch the transmission channel to the reception channel to be used. The display device 110 may receive twice the amount of data that is received using one reception channel. That is, the display device 110 can output higher-resolution video content in comparison to the case where one reception channel is used.

At step 603, if the external electronic device connected to the electronic device 100 is not the display device 110, the control unit 510 transmits/receives data in the existing connection type.

The circuit configuration of the electronic device 100 according to an embodiment of the present disclosure may be changed so that the electronic device 100 can output not only a full HD image but also an image having higher resolution than the full HD image such as QFHD or UHD on the basis of using USB Type C. Specifically, in the case where the electronic device 100 is connected to the display device 110 using USB Type C, the electronic device 100 may transmit the data using the transmission channel only resulting in a highly asymmetrical communication channel. In this case, the reception channel of the electronic device 100 may receive only a small amount of control data from the display device 110. The reception channel of the electronic device 100 may have low utilization. In the case where the electronic device 100 according to an embodiment of the present disclosure is connected to the external electronic device using USB Type C, the electronic device 100 may confirm whether the connected external electronic device is the display device 110, and if the connected external electronic device is the display device 110, it may switch the reception channel of the electronic device 100 with low utilization to the transmission channel. Further, the electronic device 100 may transmit the data to the display device 110 using the two transmission channels. That is, since the electronic device 100 transmits the data using the existing transmission channel and the switched transmission channel, it can transmit the data at the transmission speed that is double the transmission speed using one transmission channel.

Figure 7:
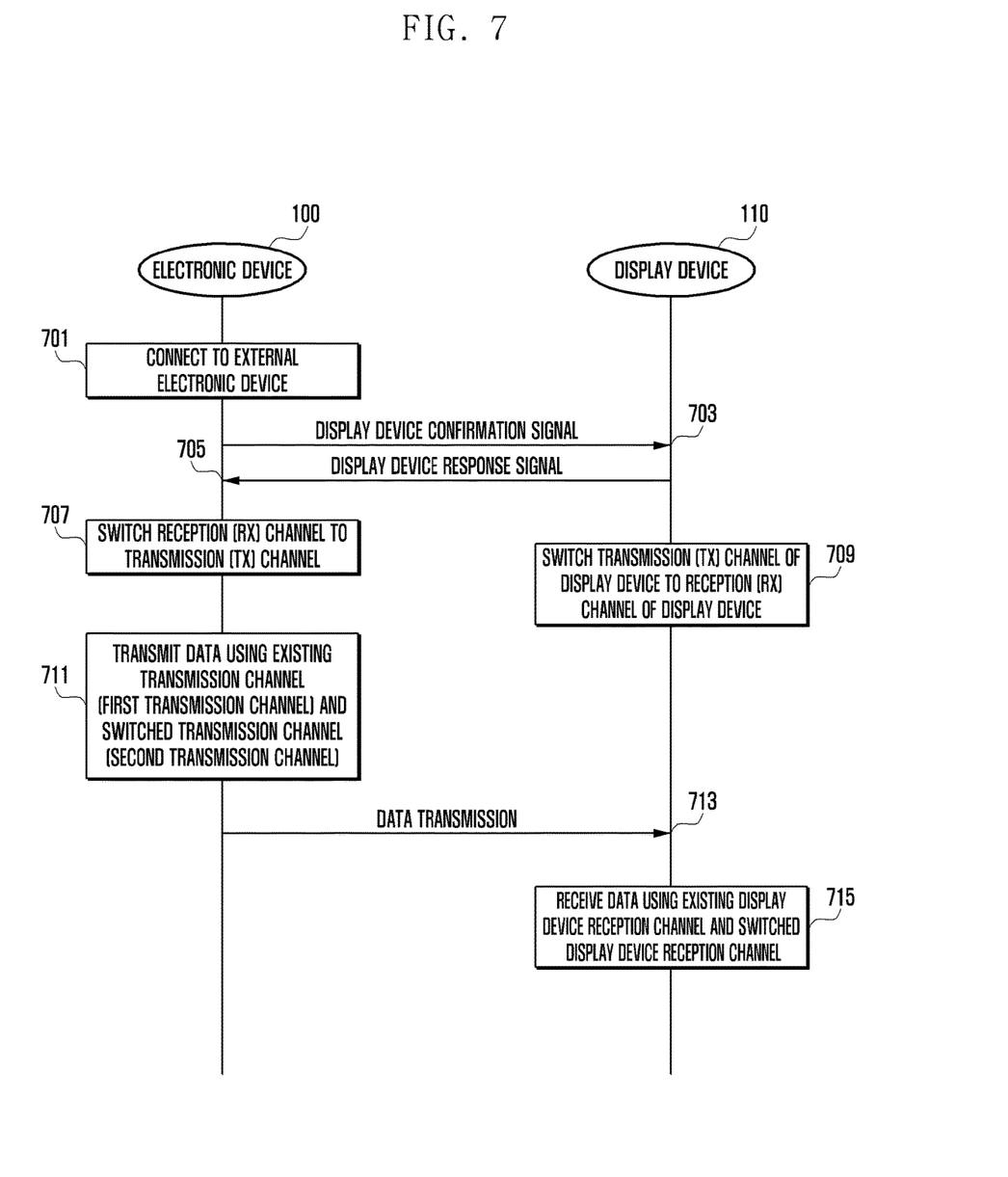
FIG. 7 is an flow diagram showing a method for confirming a connection between an electronic device and a display device and transmitting data through switching of a reception channel of the electronic device to a transmission channel and switching of a transmission channel of the display device to a reception channel according to an embodiment of the present disclosure.

FIG. 7 is an flow diagram showing a method for confirming a connection between an electronic device and a display device and transmitting data through switching of a reception channel of the electronic device to a transmission channel and switching of a transmission channel of the display device to a reception channel according to an embodiment of the present disclosure.

Referring to FIG. 7, at step 701, the electronic device 100 confirms that the external electronic device is connected. At step 703, the electronic device 100 transmits a confirmation signal for confirming whether the connected external electronic device is the display device 110. The control unit 510 may transmit the confirmation signal to the external electronic device 110 through the transmission channel. At step 705, the external electronic device transmits a display device response signal to the electronic device 100 in response to the confirmation signal. In this case, the external electronic device may transmit the response signal to the electronic device 100 through the transmission channel of the external electronic device. The electronic device 100 may recognize that the external electronic device is the display device 110 on the basis of the response signal that is transmitted from the external electronic device.

At step 707, the control unit 510 switches the reception channel of the electronic device 100 to the transmission channel. Since the external electronic device is the display device 110, the control unit 510 may determine that almost no signal is received from the display device 110. Accordingly, at step 707, the control unit 510 switches the reception channel of the electronic device 100 to the transmission channel in order to utilize the reception channel. At step 709, the display device 110 switches the transmission channel to the reception channel. For example, at step 707, the control unit 510 transmits a channel switching signal to the display device 110 to perform step 709 after switching the reception channel of the electronic device 100 to the transmission channel. At step 703, the control unit 510 transmits the channel switching signal simultaneously with a display device confirmation signal. Step 707 and step 709 are respectively performed by the electronic device 100 and the display device 110. Further, at step 711, the electronic device 100 transmits data such as video content to the display device 110 using the existing transmission channel (e.g., first transmission channel) and the switched transmission channel (e.g., second transmission channel, which was the reception channel before being switched to the transmission channel at step 707). At step 713, the control unit 510 of the electronic device 100 transmits the data to the display device 110. Since the control unit 510 transmits the data through two transmission channels, it can transmit the data at transmission speed that double the transmission speed when the data is transmitted through only one transmission channel. At step 715, the display device 110 receives the data from the electronic device 100 using the existing display device reception channel and the switched reception channel (at step 709, the transmission channel of the display device 110 is switched to the reception channel).

Figure 8A:
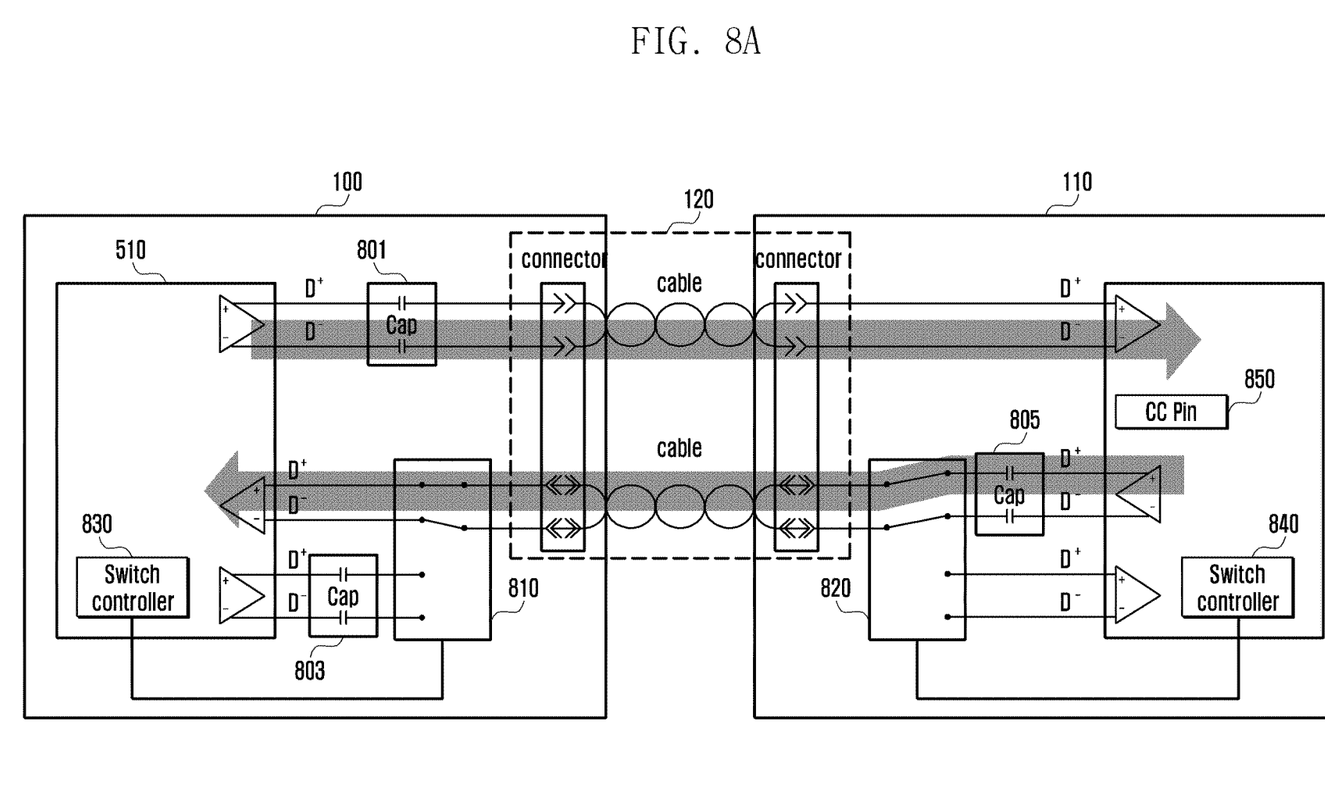
FIG. 8A is a circuit diagram showing a process in which an electronic device according to an embodiment of the present disclosure transmits/receives signals to confirm a connection between the electronic device and a display device.

FIG. 8A is a circuit diagram showing a process in which an electronic device according to an embodiment of the present disclosure transmits/receives signals to confirm a connection between the electronic device and a display device.

Referring to FIG. 8A, the electronic device 100 is connected to the display device 110 using the USB Type C cable 120. The electronic device 100 includes a control unit 510, capacitors 801 and 803, a switch 810, and a connector. Further, the display device 110 includes a capacitor 805, a switch 820, and a connector. The display device 110 includes a control unit controlling a switch controller 840 and a CC pin 850, but is not limited thereto. That is, the display device 110 may be controlled by the control unit 510 of the electronic device 100. Further, the USB Type C cable 120 may be composed of a connector and a cable, and the connector may be a USB connection port of USB Type C. The USB Type C cable 120 may be composed of one transmission channel having two lines and one reception channel, and the transmission channel and the reception channel may transmit a signal in one direction. The electronic device 100 and the display device 110 illustrated in FIG. 8A are connected through the USB Type C cable 120, and each of the electronic device 100, the display device 110, and the USB Type C cable 120 may include a USB Type C port. For example, in the case where the USB Type C port included in the electronic device 100 is an upstream port, the USB Type C cable 120 may include a downstream port. Accordingly, the electronic device 100 and the USB Type C cable 120 may be connected to each other. The display device 110 may also be connected using the USB Type C cable and USB Type C downstream/upstream ports.

Figure 8B:
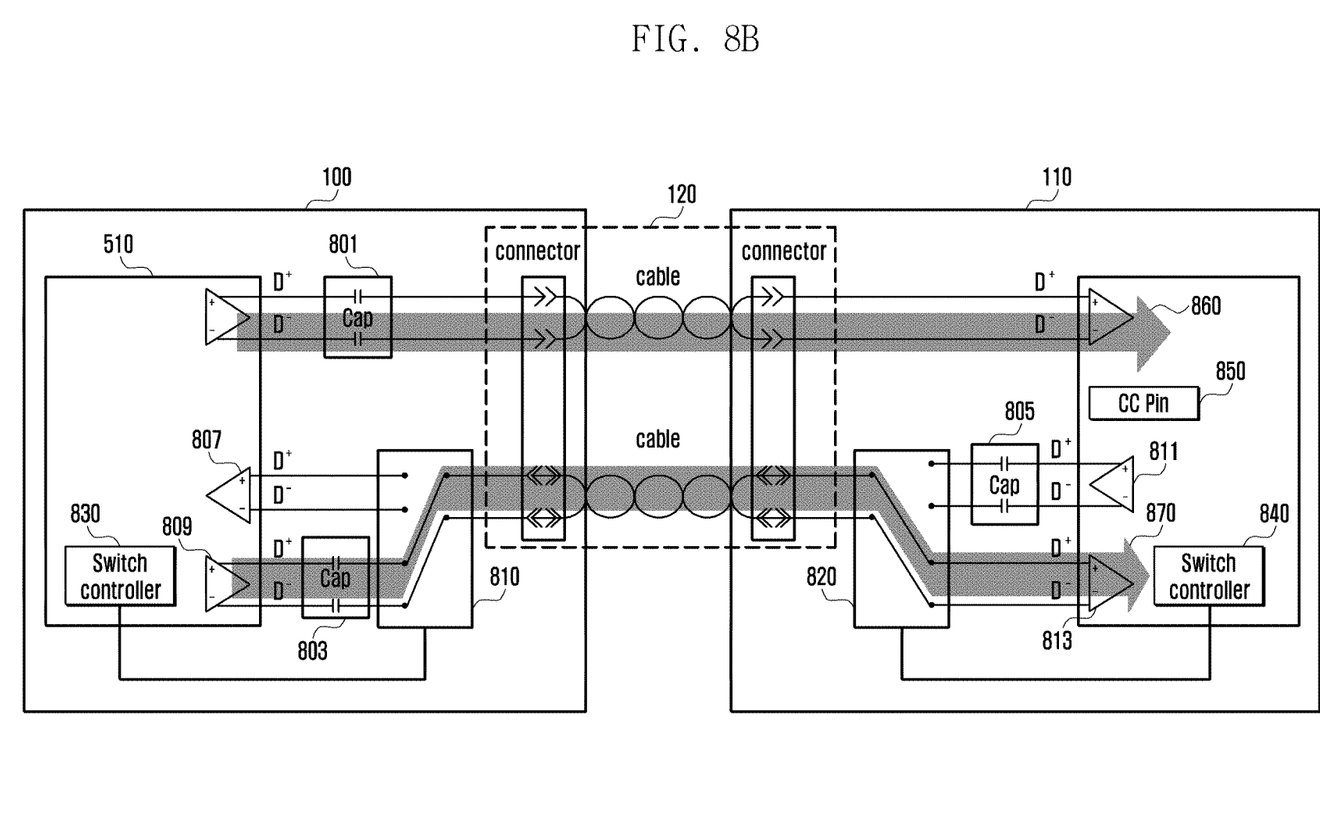
FIG. 8B is a circuit diagram showing a process in which an electronic device according to an embodiment of the present disclosure confirms a connection with a display device and then switches a reception channel of the electronic device to a transmission channel to transmit data to the display device.

Referring to FIG. 8A, the electronic device 100 transmits a signal to the display device 110 through the capacitor 801 and the USB Type C cable 120. The display device 110 receives the signal that is transmitted from the electronic device 100 and transmits a response signal to the electronic device 100 in response to the received signal. For example, the display device 110 transmits a response signal to the electronic device 100 through the capacitor 805 and the USB Type C cable 120. In this case, the display device 110 may transmit a certain code value that is included in the CC pin 850 together with the response signal. Here, the code value may be a predefined specific numerical value so that the electronic device 100 can confirm that the external electronic device is the display device 110. If the external electronic device is connected, the electronic device 100 according to an embodiment of the present disclosure may transmit a confirmation signal for confirming the external electronic device, and may receive the response signal in response to the confirmation signal. In this case, the response signal may include a certain code value that can specify the external electronic device. The electronic device 100 may confirm which electronic device the external electronic device is on the basis of the code value included in the received response signal. FIG. 8B is a circuit diagram showing a process in which an electronic device according to an embodiment of the present disclosure confirms a connection with a display device and then switches a reception channel of the electronic device to a transmission channel to transmit data to the display device.

FIG. 8B illustrates a circuit diagram that is changed after the electronic device 100 in FIG. 8A confirms the connection with the display device 110. If the connected external electronic device is the display device 110, the electronic device 100 may switch the reception channel to the transmission channel. In general, the display device 110 operates to receive content and to display (output) the received content on the display. That is, the display device 110 scarcely transmits a signal to the connected electronic device 100, and even the transmitted signal may be a signal that does not exert an influence on the operation of the electronic device 100. Accordingly, the electronic device 100 according to the present disclosure may switch the transmission channel of the display device 110, i.e., the reception channel of the electronic device 100, to the transmission channel, and may use the existing reception channel as the transmission channel. Specifically, the electronic device 100 may confirm that the connected electronic device is the display device 110 and may control the switch 810 through a switch controller 830. The switch 810 may change a line so that a circuit diagram connected to the existing reception buffer 807 is connected to an added transmission buffer 809. Accordingly, the display device 110 may control the switch 820 of the display device 110 through the switch controller 840. The switch 820 of the display device 110 may change a line, so that a circuit diagram connected to the existing transmission buffer 811 is connected to an added reception buffer 813. The display device 110 may be controlled by the electronic device 100. For example, when the electronic device 100 is first connected to the display device 110, it may include a control signal to the confirmation signal to be transmitted. Further, the electronic device 100 may separately transmit the control signal after confirming the connection of the display device 110. Further, the display device 110 may receive the control signal from the electronic device 100 and may control the switch 820 through the switch controller 840 in response to the control signal. As a result, the electronic device 100 may switch the existing reception channel to the transmission channel. Further, in the case where a control unit that can control the overall operation of the display device 110 is built in the display device 110, the control unit of the display device 110 may receive the control signal from the electronic device 100 and may directly control the switch controller 840.

Referring to FIG. 8B, the electronic device 100 transmits the data through the existing transmission channel 860 and a switched transmission channel 870, i.e., through two transmission channels. Accordingly, the electronic device 100 can transmit the data at the transmission speed that is double the transmission speed when transmitting the data using one transmission channel. The display device 110 according to an embodiment of the present disclosure may receive and output high-resolution video content, such as QFHD or UHD, on the basis of the specification of the display device 110.

According to the method for improving a data transmission speed and the electronic device implementing the same according to various embodiments of the present invention, which can improve the data transmission speed by changing the reception channel to the transmission channel in the case where the external display device is connected to the electronic device, the transmission channel becomes twice without the reception channel, and thus the data transmission speed can be improved twice in theory. The connected external display device basically performs an operation of receiving data and outputting an image. That is, the external display device serves to receive video data from the electronic device to output the same other than transmitting specific data to the connected electronic device. Since the electronic device according to the present invention switches the left reception channel to the transmission channel in the case where it is connected to the external display device, the channel utility is improved to 200%, and the data transmission speed is increased twice in theory.

According to various embodiments of the present disclosure, at least a part of devices (e.g., modules or their functions) or methods (e.g., operations) may be implemented by instructions that are stored in a computer readable storage medium in the form of programming modules. In the case where the instructions are executed by one or more processors, the one or more processors may perform functions corresponding to the instructions. The computer readable storage medium may be, for example, the memory. At least a part of the programming module may be implemented (e.g., executed) by the processor. At least a part of the programming module may include, for example, modules, programs, routines, sets of instructions, or processes, which perform one or more functions.

The computer readable recording medium may include a magnetic medium, such as a hard disc, a floppy disc, or a magnetic tape, an optical medium, such as a Compact Disc Read Only Memory (CD-ROM) or a Digital Versatile Disc (DVD), a magneto-optic medium, such as a floptical disk, or a hardware device specially configured to store and retrieve program commands (e.g., programming modules), such as a Read Only Memory (ROM), a Random Access Memory (RAM), or a flash memory. Further, examples of program instructions may include not only machine language codes made by a compiler but also high level language codes that can be executed by a computer using an interpreter and the like. The above-described hardware device may be configured to operate as one or more software modules for performing the operations according to various embodiments of the present disclosure, and vice versa.

The module or programming module according to various embodiments of the present disclosure may include one or more of the above-described constituent elements, a part thereof may be omitted, or other additional constituent elements may be further included therein. The operations that are performed by the module according to various embodiments of the present disclosure, the programming module, or other constituent elements may be performed in a successive, parallel, repetitive, or heuristic manner. Further, some operations may be executed in a different order or may be omitted, or other operations may be added.

It will be understood that the above-described embodiments are given as examples to understand the contents of the present disclosure and do not limit the scope of the present disclosure. Accordingly, the scope of the present disclosure is defined by the appended claims and their equivalents, and it will be construed that all corrections and modifications derived from the meanings and scope of the following claims and their equivalents fall within the scope of the present disclosure.

What is claimed is:

1. An electronic device comprising:
   a USB connection unit configured to be connectable to an external electronic device and including a data reception channel and a data transmission channel;
   a switch unit configured to switch an electrical connection between the data reception channel and data transmission channel; and
   a control unit configured to:
   recognize a connection with the external electronic device via the USB connection unit,
   detect whether the external electronic device is a display device based on device attribute information of the external electronic device, and
   control the switch unit to switch the electrical connection so that the data reception channel functions as a data transmission channel if the external electronic device is the display device.

2. The electronic device of claim 1, wherein the control unit transmits a confirmation request signal for detecting whether the external electronic device is the display device, receives a response signal that is transmitted from the external electronic device in response to the confirmation request signal, and identifies that the external electronic device is the display device on the basis of the device attribute information included in the response signal.

3. The electronic device of claim 2, wherein the device attribute information includes an ID value predefined based on the external electronic device, and a specific numerical value corresponding to the display device to detect whether the external electronic device is the display device.

4. The electronic device of claim 1, wherein the control unit transmits a switching request for switching an electrical connection so that a data transmission channel of the USB connection unit that is provided in the display device functions as a data reception channel of the USB connection unit.

5. A method for improving a transmission speed of an electronic device, the method comprising:
   recognizing, by the electronic device, a connection with an external electronic device via a USB connection unit including a data reception channel and a data transmission channel;
   detecting, by the electronic device, whether the external electronic device is a display device based on device attribute information of the external electronic device; and
   if the external electronic device is the display device, switching an electrical connection so that the data reception channel functions as a data transmission channel.

6. The method of claim 5, wherein detecting whether the external electronic device is a display device based on the device attribute information of the external electronic device comprises:
   transmitting a confirmation request signal for detecting whether the external electronic device is the display device;
   receiving a response signal from the external electronic device in response to the confirmation request signal; and
   identifying that the external electronic device is the display device on the basis of the device attribute information included in the response signal.

7. The method of claim 6, wherein the device attribute information includes an ID value predefined based on the external electronic device, and a specific numerical value corresponding to the display device to detect whether the external electronic device is the display device.

8. The method of claim 5, further comprising transmitting a switching request for switching an electrical connection so that a data transmission channel of the USB connection unit that is provided in the display device functions as a data reception channel of the USB connection unit.

\* \* \* \* \*